United States Patent [19]
Nowicke, Sr.

[11] Patent Number: 5,755,151
[45] Date of Patent: *May 26, 1998

[54] BARBECUE GRILLO SMOKER CONVERSION

[76] Inventor: Frank L. Nowicke, Sr., P.O. Box 20168, 55 Grasso Pl., St. Louis, Mo. 63123-0368

[*] Notice: The term of this patent shall not extend beyond the expiration date of Pat. No. 5,564,330.

[21] Appl. No.: 695,423

[22] Filed: Aug. 12, 1996

[51] Int. Cl.⁶ ............... A47J 37/06; A47J 37/07
[52] U.S. Cl. .............. 99/340; 99/444; 99/482; 126/9 R; 126/25 R
[58] Field of Search ............ 99/339, 340, 448–450, 99/352, 467, 482, 481; 126/25 R, 9 R, 9 B, 26, 30

[56] References Cited

U.S. PATENT DOCUMENTS

| | | | |
|---|---|---|---|
| 4,094,295 | 6/1978 | Boswell et al. | 126/25 |
| 4,334,462 | 6/1982 | Hefling | 99/385 |
| 4,512,249 | 4/1985 | Mentzel | 99/352 |

*Primary Examiner*—Timothy F. Simone
*Attorney, Agent, or Firm*—Polster, Lieder, Woodruff & Lucchesi, L.C.

[57] ABSTRACT

A cooking grill modified by a sleeve to convert the grill into a food smoker in which there is a sleeve of rolled form carried on the cooking grill to position a food supporting grill spaced from the source of heat, and providing handles on the sleeve in position to allow removal of the sleeve to free up access to the fuel in the cooking grill. The rolled form constitutes a kit and are adapted to extend the utility of the cooking grill for food smoking treatment.

5 Claims, 2 Drawing Sheets

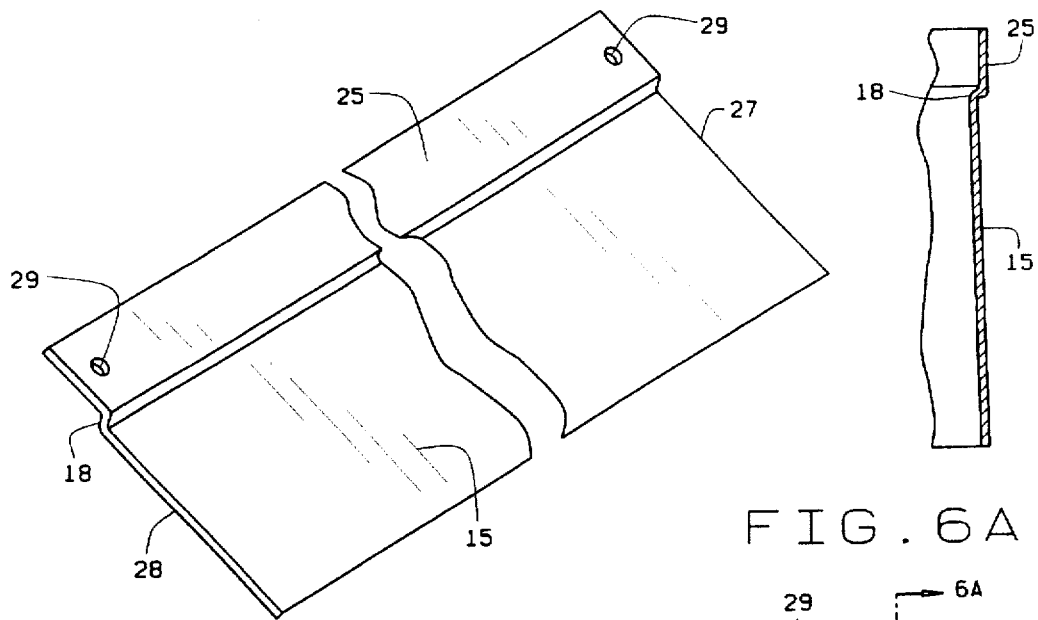
FIG. 5
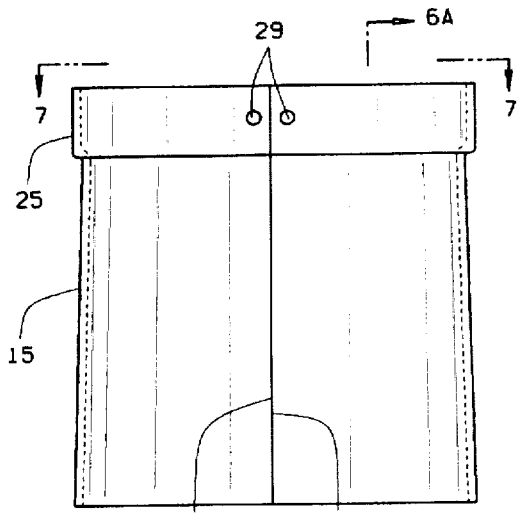
FIG. 6A
FIG. 6
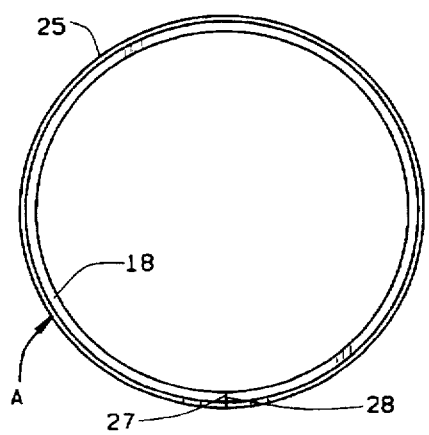
FIG. 7
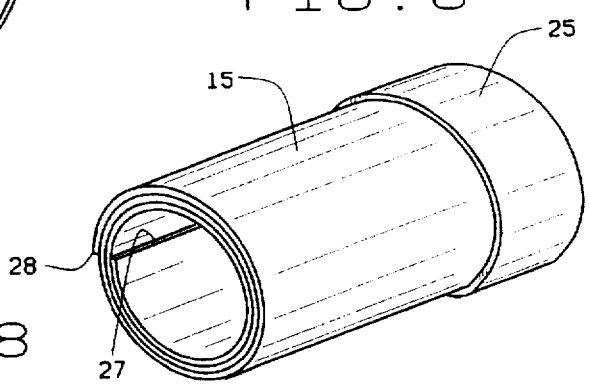
FIG. 8

BARBECUE GRILLO SMOKER CONVERSION

BACKGROUND OF THE INVENTION

1. Field of the Invention

This invention is directed to a barbecue grill and smoker conversion for rendering a grill cooker convertible into a smoker in which the grill can increase its utility by being converted to a smoker.

2. Description of the Prior Art

The relevant prior art for barbecue devices is known to have a bowl in which the fuel for cooking is deposited beneath a grill which supports the objects to be cooked. The cooker is provided with a cover to reflect the heat back to the grill to retain the heat and smoke. While smoke can influence the taste characteristics of the objects placed on the grill, the closeness of the objects on the grill to the heat of the burning fuel results in rapid cooking which prevents obtaining a desired smoked taste quality.

Some barbecue grills may be able to convert to a smoker in a single embodiment, such as shown in a Weber-Stephen Model No. 2890. That embodiment requires an access door to the fire area for the addition of fuel. The objection is that the method of introducing fuel for smoking is very haphazard in regard to being able to establish the right amount of fuel which is an important aspect for obtaining good smoking results.

SUMMARY OF THE INVENTION

The object of the invention is to convert a barbecue grill type cooker to one that has a recessed grill to support smoked product as an added feature to the normal use as a grill cooker.

A further object is to produce a smoker feature for a grill cooker by providing a lift-off smoker sleeve to make access easy to the fire area.

Yet another object is to provide a smoker device that is easily removed while hot so that the fuel can be controlled as to content and amount to provide a desired smoke result.

Still another object is to provide a recessed smoker device that can be quickly and easily removed and replaced so as not to disturb or cool the product during the smoking process.

In addition, fuel for smoking can be easily dampened to produce the quality of smoke that is desired, the fuel dampening step being accomplished before or during the smoking effect. Other objects will be referred to in the following details of the smoker device disclosed in a preferred embodiment in drawings as follows.

BRIEF DESCRIPTION OF THE DRAWINGS

A preferred embodiment of the invention is seen in the several drawing views, wherein:

FIG. 5 is a plan view of the smoker sleeve in its laid out flat condition;

FIG. 6 is a view of a smoker sleeve in its rolled up form as an adapter;

FIG. 6A is a section view at line 6A—6A in FIG. 7;

FIG. 7 is a plan view of the sleeve seen at line 7—7 in FIG. 6; and

FIG. 8 is a perspective view of a form of the invention arranged as a sales kit to convert a cooker grill to a smoker.

DETAILED DESCRIPTION OF THE INVENTION

Figure 3:
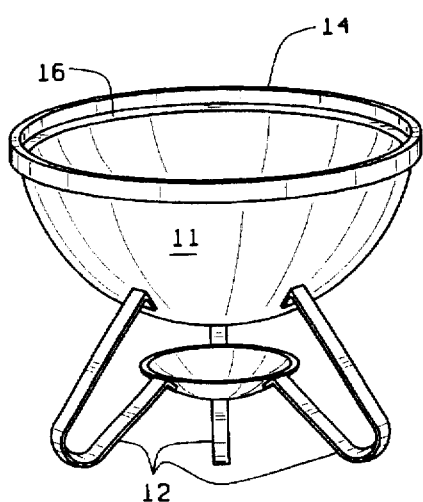
FIG. 3 is a view of the base unit of a fuel holder useful in the smoker of FIG. 1.
Figure 4:
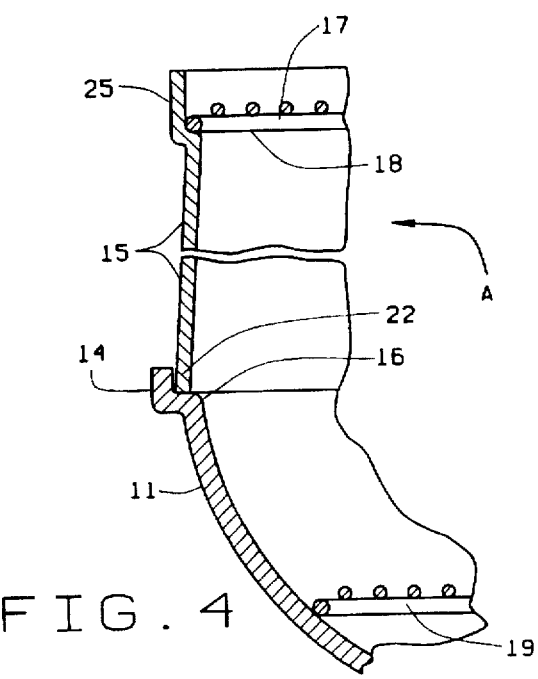
FIG. 4 is a fragmentary view of the smoker assembly to show the recessing of the smoker grill above the fuel supporting grate.

A preferred embodiment of a grill cooker 10 with a smoker conversion adapter A comprises a fire containing base 11 supported on at least three tripod legs 12 which carry an ash receiver 13. The base 11 is formed with an upwardly presented rim 14. The base 11 supports a smoker conversion adapter A in the form of a circular sleeve 15 which has a circumferential size selected to fit within the base rim 14 on the step 16 seen in FIG. 3. The assembly in FIG. 2 has the circular sleeve 15 formed to support a food supporting grill 17 on the upper end inner step shelf 18 of sleeve 15 so food to be smoked can be sufficiently above the heat to slow the cooking process and to give the rising smoke time to penetrate the food supported on the grill 17. The assembly seen in FIG. 4 illustrates an important aspect of the invention which is the shaping of the adapter sleeve to support the grill 17 from the stepped shelf 18 of the circular sleeve 15. Thus, the grill 17 is spaced from the grate 19 on which the fuel can be placed. A pair of handles 21 secured on opposite sides of the sleeve 15 permit manual movement of the sleeve.

It will be appreciated from the views of FIGS. 1, 2, 3 and 4 that an important feature of the embodiment resides in the easy ability to lift the sleeve 15, with or without a cover 20, off the base 14 by grasping the non-heat absorbing handles 21 and lifting the sleeve off to expose the heat source on the grate 19. This procedure can be accomplished without disturbing the food on the grill 17 or without removing the cover 20 which could retain the heat and smoke while adjusting the fuel on the grate 19 or adding more fuel.

Figure 1:
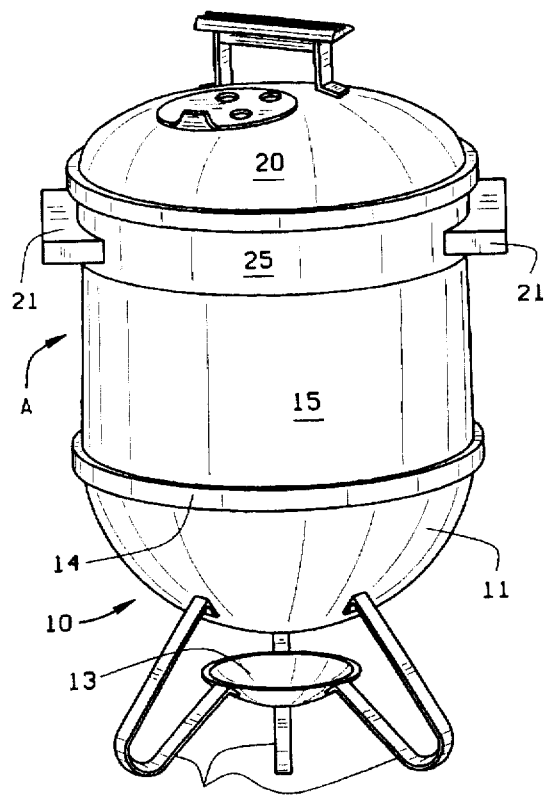
FIG. 1 is a perspective view of a smoker assembly for converting a cooking grill to a use as a smoker.
Figure 2:
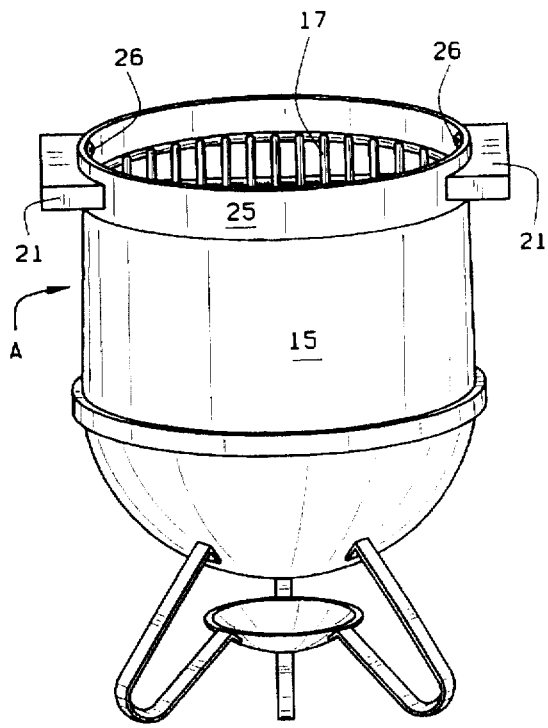
FIG. 2 is a view similar to FIG. 1 with the cover removed to show a recessed grill on which objects can be placed for smoking.

A unique feature of the invention is disclosed in the several views of the drawings of FIGS. 2 and 4 inclusive. For example, in FIG. 2 the sleeve 15 is circumferentially sized so its bottom end 22 fits into the stepped shelf 16 of the base 11 while its opposite upper end is formed with an enlarged circumferential flange 25 to surround an internal step shelf 18. The spaced ends 22 and 25 are manually positionable by handles 21 having threaded elements 26 projecting through the flange 25 and into the handle. The flange 25 is formed with punched apertures 29 to receive the handle threaded elements 26. Retaining bolt 26 (seen in FIG. 2) can be employed in pairs in the well understood usual manner. The view of FIG. 6 shows a pair of apertures 29 to receive one of the handle elements 26 to secure a handle 21 to bridge the butt joint at ends 27 and 28.

The sheet metal seen in FIG. 5 is unique in that there is the elongated metallic sheet 15 having a first surface in one plane and a second sheet 25 in a second plane which is off set from the first plane. When the metallic sheet is rolled into a sleeve A the off set plane exposes a shelf surface where the two plane meets with the shelf on top of the first surface. Thus, as seen in FIG. 4, the grill 17 is seated on that shelf to be spaced from the heat in the base grate 19. The material of roller adapter A can be any suitable metal having a thickness capable of providing suitable cylindrical strength and stiffness as desired. The formation of the adapter A has the character illustrated in FIGS. 6, 6A and 7.

A further unique feature of the invention is seen in FIG. 8. In that view, the elongated sleeve 15 is rolled into a tubular or circular shape until it assumes a suitable diameter to be slidably received in a merchandising box with a pair of handles 21 and associated hardware enclosed inside the tube before the box is closed. Thus, the sleeve 15 and handles 21, with the described hardware, can be sold in kit form to be assembled in the manner shown in FIG. 2 to convert a cooking grill smoker sleeve from a kit form to an adapter A.

While a preferred embodiment of the invention has been described in the foregoing description, it can be appreciated that the sleeve and handles can be merchandised in loose form. Furthermore, the adapter A can have a straight cylindrical shape, or the sleeve can have a trapezoid shape by cutting the ends 27 and 28 so as to have an angular relation which will result in the sleeve being conically shaped when the ends are placed in abutment.

What is claimed is:

1. An adapter for barbecue grill conversion to a food smoker having a fuel supporting base providing an open rim, the adapter comprising:

a) a flat sheet formed into a cylindrical sleeve having an open bottom fitted to said base open rim and an opposite open end;

b) an extension on said opposite end of said sleeve forming an outlet end, said extension on said sleeve being offset to the outside of said sleeve to provide an internal shelf in said sleeve;

c) a food supporting grill adapted to be seated on said internal shelf; and d) a sleeve cover fitted over said opposite end of said outlet end of said extension.

2. The adapter set forth in claim 1 wherein said sleeve and said extension are integrally formed.

3. The adapter set forth in claim 1 wherein said sleeve and said extension are formed from sheet metal.

4. An adapter for barbecue grill conversion of a food cooking fuel containing base into a food smoker, the adapter comprising:

a) an elongated metallic sheet having a first surface in one plane and a second surface in a second plane, with said second plane being off set outwardly from said first plane, and metallic sheet being rolled into a sleeve form in which said off set second plane is positioned to surround and expose a shelf surface in the plane of said first surface;

b) handle means attached to said metallic sheet for secure said metallic sheet in said rolled sleeve form sized to fit on the fuel containing base;

c) a food supporting grill supported inside said rolled sleeve on said shelf surface spaced from the fuel containing base; and d) cover means adapted to be supported by said second surface on said rolled sleeve to retain the fuel smoke adjacent said food supporting grill.

5. An adapter for converting a barbecue grill cooker into a smoker kit comprising a sheet metal component rolled into a cylindrical sleeve for packaging, and handle hardware located inside said rolled component, said rolled component and handle hardware being assembled as a kit.

* * * * *